(12) United States Patent
Kley et al.

(10) Patent No.: US 8,004,227 B2
(45) Date of Patent: Aug. 23, 2011

(54) METHOD FOR OPERATING A ROTATING ELECTRICAL MACHINE

(75) Inventors: Jonas Kley, Winterthur (CH); Georgios Papafotiou, Adliswil (CH)

(73) Assignee: ABB Research Ltd, Zurich (CH)

( * ) Notice: Subject to any disclaimer, the term of this patent is extended or adjusted under 35 U.S.C. 154(b) by 526 days.

(21) Appl. No.: 12/207,670

(22) Filed: Sep. 10, 2008

(65) Prior Publication Data

US 2009/0066276 A1 Mar. 12, 2009

(30) Foreign Application Priority Data

Sep. 10, 2007 (EP) .................................. 07116035

(51) Int. Cl.
*G05B 21/02* (2006.01)

(52) U.S. Cl. ........... 318/504; 318/636; 318/479; 363/74

(58) Field of Classification Search ............ 318/400.15, 318/478, 479, 504, 636; 363/74, 95, 98, 363/109, 123, 131
See application file for complete search history.

(56) References Cited

U.S. PATENT DOCUMENTS

| | | | | |
|---|---|---|---|---|
| 5,481,448 A * | 1/1996 | Nakata et al. | ................. | 363/137 |
| 5,907,228 A | 5/1999 | Thomas et al. | | |
| 6,031,738 A * | 2/2000 | Lipo et al. | ....................... | 363/37 |
| 6,058,031 A * | 5/2000 | Lyons et al. | ..................... | 363/67 |
| 6,459,596 B1 * | 10/2002 | Corzine | .......................... | 363/37 |
| 6,842,354 B1 * | 1/2005 | Tallam et al. | .................... | 363/98 |
| 7,256,561 B2 | 8/2007 | Geyer et al. | | |

FOREIGN PATENT DOCUMENTS

| EP | 0 812 059 A1 | 12/1997 |
|---|---|---|
| EP | 1 670 135 A1 | 6/2006 |
| FR | 2 791 488 A1 | 9/2000 |

OTHER PUBLICATIONS

European Search Report for 07116035.2, completed Jan. 24, 2008.
Zhuohui Tan et al., "A Direct Torque Control of Induction Motor Based on Three-level NPC Inverter," 32nd Annual IEEE Power Electronics Specialists Conference, PESC 2001, Conference Proceedings, Jun. 17-21, 2001, vol. 3, Conference 32, pp. 1435-1439.

* cited by examiner

*Primary Examiner* — Bentsu Ro
(74) *Attorney, Agent, or Firm* — Buchanan Ingersoll & Rooney PC

(57) ABSTRACT

A method is specified for operating a rotating electrical machine, in which the rotating electrical machine is connected in terms of phase to a converter circuit, having a DC voltage circuit, for connecting at least two voltage levels, and the phases of the converter circuit are connected to the DC voltage circuit in accordance with a selected switching state combination of switching states for power semiconductor switches in the converter circuit. In order for operation of the rotating electrical machine to be possible in an event, over a number L of sampling times various values are determined, and a switching state combination is set as the selected switching state combination with which a sum of determined values is at its smallest.

14 Claims, 3 Drawing Sheets

METHOD FOR OPERATING A ROTATING ELECTRICAL MACHINE

RELATED APPLICATION

This application claims priority under 35 U.S.C. §119 to European Patent Application No. 07116035.2 filed in Europe on Sep. 10, 2007, the entire content of which is hereby incorporated by reference in its entirety.

TECHNICAL FIELD

The disclosure relates to the field of operating methods for rotating electrical machines.

BACKGROUND INFORMATION

High-power voltage converter circuits are used in many applications today. Such a converter circuit usually connects three voltage levels and is often used for operating rotating electrical machines, in particular in synchronous and asynchronous machines, which rotating electrical machines generally have three stator windings. In a conventional method for operating a rotating electrical machine, it is connected in terms of phase to such a converter circuit, having a DC voltage circuit, for connecting generally m voltage levels, where $m \geq 2$. In the case of a converter circuit for connecting typically three voltage levels, the DC voltage circuit is formed by a first capacitor and by a second capacitor which is connected in series with the first capacitor, the DC voltage circuit also having a first main connection at the first capacitor, a second main connection at the second capacitor and a subconnection formed by the two series-connected capacitors. Furthermore, the converter circuit for connecting three voltage levels comprises power semiconductor switches, which are generally interconnected. In relation thereto, FIG. 1 shows an embodiment of a known three-phase converter circuit for connecting three voltage levels. According to the method, the phases of the converter circuit are generally connected to the DC voltage circuit in accordance with a selected switching state combination of switching states for the power semiconductor switches in the converter circuit. In the case of a converter circuit for connecting three voltage levels, the phases of the converter circuit are accordingly connected to the first main connection, to the second main connection or to the subconnection according to a selected switching state combination of switching states for the power semiconductor switches in the converter circuit. In a state diagram shown in FIG. 2, these switching state combinations and their transitions with respect to one another are shown, the "+" representing a connection of the corresponding phase to the first main connection, "−" representing a connection of the corresponding phase to the second main connection and "0" representing a connection of the corresponding phase to the subconnection.

The selection of the corresponding switching state combinations takes place, for example, according to the known "direct torque control" (DTC) method, in which the latest actual value for the torque of the rotating electrical machine, the magnetic stator flux of the rotating electrical machine and the potential at the subconnection are initially in each case compared with an associated predetermined value range. The respectively predetermined value range is or can be time-variant and is usually determined by an upstream closed-loop control circuit from reference values for the torque of the rotating electrical machine, the magnetic stator flux of the rotating electrical machine and the potential at the subconnection. If a latest actual value now exceeds its associated predetermined value range, a switching state combination is selected from a table as a function of the preceding selected switching state combination such that the latest value resulting for this switching state combination could, if need be, again be within the associated value range, this not being guaranteed. In addition, a switching state combination is always only selected either with respect to the latest actual value for the torque, the magnetic stator flux or the potential when the associated value range is exceeded. The latest actual value for the torque, the magnetic stator flux and the potential is not considered jointly.

One problem with a method described above for operating a rotating electrical machine by means of the known "direct torque control" is the fact that there are typically a plurality of transitions between the preceding selected switching state combination and the latest selected switching state combination, these transitions being illustrated in FIG. 2 as lines between the switching state combinations. The switching state combinations and the transitions from one switching state combination to another are generally stored permanently in the table, in which case typically not all of the combination possibilities for the switching state combination are stored in the table, as shown in FIG. 2. Furthermore, in the case of "direct torque control", only one switching state combination is selected as a function of the preceding selected switching state combination with the associated transitions, which is stored in the table and which brings the latest value resulting for the selected switching state combination back to within the associated value range again. Switching state combinations to be selected as an alternative, in particular with possibly fewer transitions to the preceding selected switching state combination, are not stored in the table. A plurality of transitions between switching state combinations do generate, however, a large number of switching operations for the power semiconductor switches in the converter circuit, as a result of which the switching frequency of the power semiconductor switches is increased. However, such a high switching frequency produces heat loss (a higher energy consumption) in the power semiconductor switches in the converter circuit, as a result of which heat loss the power semiconductor switches age more quickly and may be damaged or even destroyed.

In this regard, EP 1 670 135 A1 specifies a method for operating a rotating electrical machine by means of which the switching frequency of power semiconductor switches in a converter circuit, which is connected in terms of phase to the rotating electrical machine, for connecting m voltage levels can be reduced, where $m \geq 2$. In accordance with the method, in one step (a) the phases of the converter circuit are connected to the DC voltage circuit in accordance with a selected switching state combination of switching states for power semiconductor switches in the converter circuit. The selection of this switching state combination takes place in the following further steps:

(b) beginning with a starting sampling time k for a selectable number N of sampling times: determination of all the switching state combinations at each of the N sampling times, where $N \geq 1$, (c) formation of switching state sequences for each determined switching state combination at the starting sampling time k, each switching state sequence being an arrangement of determined switching state combinations of the N sampling times next to one another in a row, said switching state combinations being associated with the respective switching state combination at the starting sampling time k, (d) for each of the switching state sequences, calculation of a torque trajectory of the rotating electrical machine and a magnetic stator flux trajectory of the rotating electrical machine from determined state value sets of the rotating electrical machine and the converter circuit for the starting sampling time k up to the sampling time k+N, (e) selection of a switching state sequence, in which an associated torque trajectory and a magnetic stator flux trajectory at the (k+N)-th sampling time is in each case within a predetermined value range and setting of this selected switching state sequence, (f) repetition of steps (a) to (d), where k=k+1.

In the method for operating a rotating electrical machine in accordance with EP 1 670 135 A1, only one switching state combination is selected and set, in which the associated torque trajectory and the associated magnetic stator flux trajectory at the (k+N)-th sampling time is in each case within a predetermined value range. However, it is possible for the torque trajectory or the magnetic stator flux trajectory of each associated switching state combination to already be outside the predetermined value range at the k-th or at the (k+1)-th sampling time, and the method for operating a rotating electrical machine in accordance with EP 1 670 135 A1 cannot handle such a state. Therefore only a restricted operation of the rotating electrical machine is possible, however.

SUMMARY

A method for operating a rotating electrical machine is disclosed which can handle switching state combinations with in each case an associated torque trajectory and magnetic stator flux trajectory, which torque trajectory and magnetic stator flux trajectory is outside the predetermined value range.

A method for operating a rotating electrical machine is disclosed, the rotating electrical machine being connected in terms of phase to a converter circuit, having a DC voltage circuit, for connecting m voltage levels, where $m \geq 2$, having the following steps (a) connection of the phases (u, v, w) of the converter circuit to the DC voltage circuit in accordance with a selected switching state combination ($SK_{a,k}$) of switching states for power semiconductor switches in the converter circuit, the selection of the switching state combination ($SK_{a,k}$) takes place in the following further steps:

(b) beginning with a starting sampling time k for a selectable number L of sampling times: determination of all the switching state combinations ($SK_k, \ldots, SK_{k+L}$) at each of the L sampling times, where $L \geq 1$, (c) formation of switching state sequences (SSK) for each determined switching state combination ($SK_k$) at the starting sampling time k, each switching state sequence (SSK) being an arrangement of determined switching state combinations ($SK_k, \ldots, SK_{k+L}$) of the L sampling times next to one another in a row, said switching state combinations ($SK_k, \ldots, SK_{k+L}$) being associated with the respective switching state combination ($SK_k$) at the starting sampling time k, (d) for each of the switching state sequences (SSK), calculation of a torque trajectory (M) of the rotating electrical machine and a magnetic stator flux trajectory ($\phi$) of the rotating electrical machine from determined state value sets ($X_{e,k}, \ldots, X_{e,k+L}$) of the rotating electrical machine and the converter circuit for the starting sampling time k up to the sampling time k+L, (e) if the torque trajectory (M) at the k-th sampling time exceeds a predetermined upper value range limit ($y_{M,max}$) or falls below a predetermined lower value range limit ($y_{M,min}$), calculation of a torque infringement value ($v_{M,k}, \ldots, v_{M,k+L}$) based on the upper and lower value range limits ($y_{M,min}, y_{M,max}$) for the sampling time k up to the sampling time k+L, (f) if the magnetic stator flux trajectory ($\phi$) at the k-th sampling time exceeds a predetermined upper value range limit ($y_{S,max}$) or falls below a predetermined lower value range limit ($y_{S,min}$) calculation of a stator flux infringement value ($v_{S,k}, \ldots, v_{S,k+L}$) based on the upper and lower value range limits ($y_{S,min}, y_{S,max}$) for the sampling time k up to the sampling time k+L, (g) for each switching state sequence (SSK) and for the sampling time k up to the sampling time k+L, determination of the maximum value ($v_{max}$) from the torque infringement values ($v_{M,k}, \ldots, v_{M,k+L}$) and the stator flux infringement values ($v_{S,k}, \ldots, v_{S,k+L}$), (h) for each switching state sequence (SSK), formation of the sum ($S_{vmax}$) of the maximum values ($v_{max}$), (i) setting that determined switching state combination ($SK_k$) at the starting sampling time k as the selected switching state combination ($SK_{a,k}$) with which the sum ($S_{vmax}$) of the maximum values ($v_{max}$) is at its smallest, (j) repetition of steps (a) to (i), where k=k+1.

A method for operating a rotating electrical machine is disclosed, the rotating electrical machine being connected in terms of phase to a converter circuit, having a DC voltage circuit, for connecting m voltage levels, where $m \geq 2$, the following steps (a) connection of the phases (u, v, w) of the converter circuit to the DC voltage circuit in accordance with a selected switching state combination ($SK_{a,k}$) of switching states for power semiconductor switches in the converter circuit, the selection of the switching state combination ($SK_{a,k}$) takes place in the following further steps:

(b) beginning with a starting sampling time k for a selectable number L of sampling times: determination of all the switching state combinations ($SK_k, \ldots, SK_{k+L}$) at each of the L sampling times, where $L \geq 1$, (c) formation of switching state sequences (SSK) for each determined switching state combination ($SK_k$) at the starting sampling time k, each switching state sequence (SSK) being an arrangement of determined switching state combinations ($SK_k, \ldots, SK_{k+L}$) of the L sampling times next to one another in a row, said switching state combinations ($SK_k, \ldots, SK_{k+L}$) being associated with the respective switching state combination ($SK_k$) at the starting sampling time k, (d) for each of the switching state sequences (SSK), calculation of a torque trajectory (M) of the rotating electrical machine and a magnetic stator flux trajectory ($\phi$) of the rotating electrical machine (1) from determined state value sets ($X_{e,k}, \ldots, X_{e,k+L}$) of the rotating electrical machine and the converter circuit for the starting sampling time k up to the sampling time k+L, (e) if the torque trajectory (M) at the k-th sampling time exceeds a predetermined upper value range limit ($y_{M,max}$) or falls below a predetermined lower value range limit ($y_{M,min}$), calculation of a torque infringement value ($v_{M,k}, \ldots, v_{M,k+L}$) based on the upper and lower value range limits ($y_{M,min}, y_{M,max}$) for the sampling time k up to the sampling time k+L, (f) if the magnetic stator flux trajectory ($\phi$) at the k-th sampling time exceeds a predetermined upper value range limit ($Y_{S,max}$) or falls below a predetermined lower value range limit ($Y_{S,min}$), calculation of a stator flux infringement value ($v_{S,k}, \ldots, v_{S,k+L}$) based on the upper and lower value range limits ($y_{S,min}, y_{S,max}$) for the sampling time k up to the sampling time k+L, (g) for each switching state sequence (SSK) and for the sampling time k up to the sampling time k+L, formation of the sum ($S_{M,v}$) of the torque infringement values ($v_{M,k}, \ldots, v_{M,k+L}$) and formation of the sum ($S_{S,v}$) of the stator flux infringement values ($v_{S,k}, \ldots, v_{S,k+L}$), (h) for each switching state sequence (SSK), formation of the maximum value ($v_{max}$) from the sum ($S_{M,v}$) of the torque infringement values ($v_{M,k}, \ldots, v_{M,k+L}$) and the sum ($S_{S,v}$) of the stator flux infringement values ($v_{S,k}, \ldots, v_{S,k+L}$), (i) setting that determined switching state combination ($SK_k$) at the starting sampling time k as the selected switching state combination ($SK_{a,k}$) with which the maximum value ($v_{max}$) is at its smallest, (j) repetition of steps (a) to (i), where k=k+1.

In another aspect, an arrangement for operating a rotating electrical machine is disclosed. One exemplary arrangement comprises a converter circuit connected by phase to the rotating electrical machine; and a DC voltage circuit for connecting at least two voltage levels, the phases of the converter circuit being connected to the DC voltage circuit in accordance with a selected switching state combination of switching states for power semiconductor switches in the converter circuit, wherein over a number L of sampling times a maximum value is determined from torque infringement values and another maximum value is determined from stator flux infringement values and these maximum values are added, and the switching state combination is set as the selected switching state combination with which the sum of the maximum values is at its smallest.

In yet another aspect, an arrangement for operating a rotating electrical machine is disclosed. One exemplary arrangement comprises a converter circuit connected by phase to the rotating electrical machine; and a DC voltage circuit for connecting at least two voltage levels, the phases of the converter circuit being connected to the DC voltage circuit in accordance with a selected switching state combination of switching states for power semiconductor switches in the converter circuit, wherein over a number L of sampling times a sum of torque infringement values and a sum of stator flux infringement values is formed, a maximum value of the sums is formed, and the switching state combination is set as the selected switching state combination with which the maximum value is at its smallest.

These and further objects, advantages and features of the present disclsoure will be disclosed in the description detailed below relating to exemplary embodiments of the disclosure in conjunction with the drawing.

Figure 1:
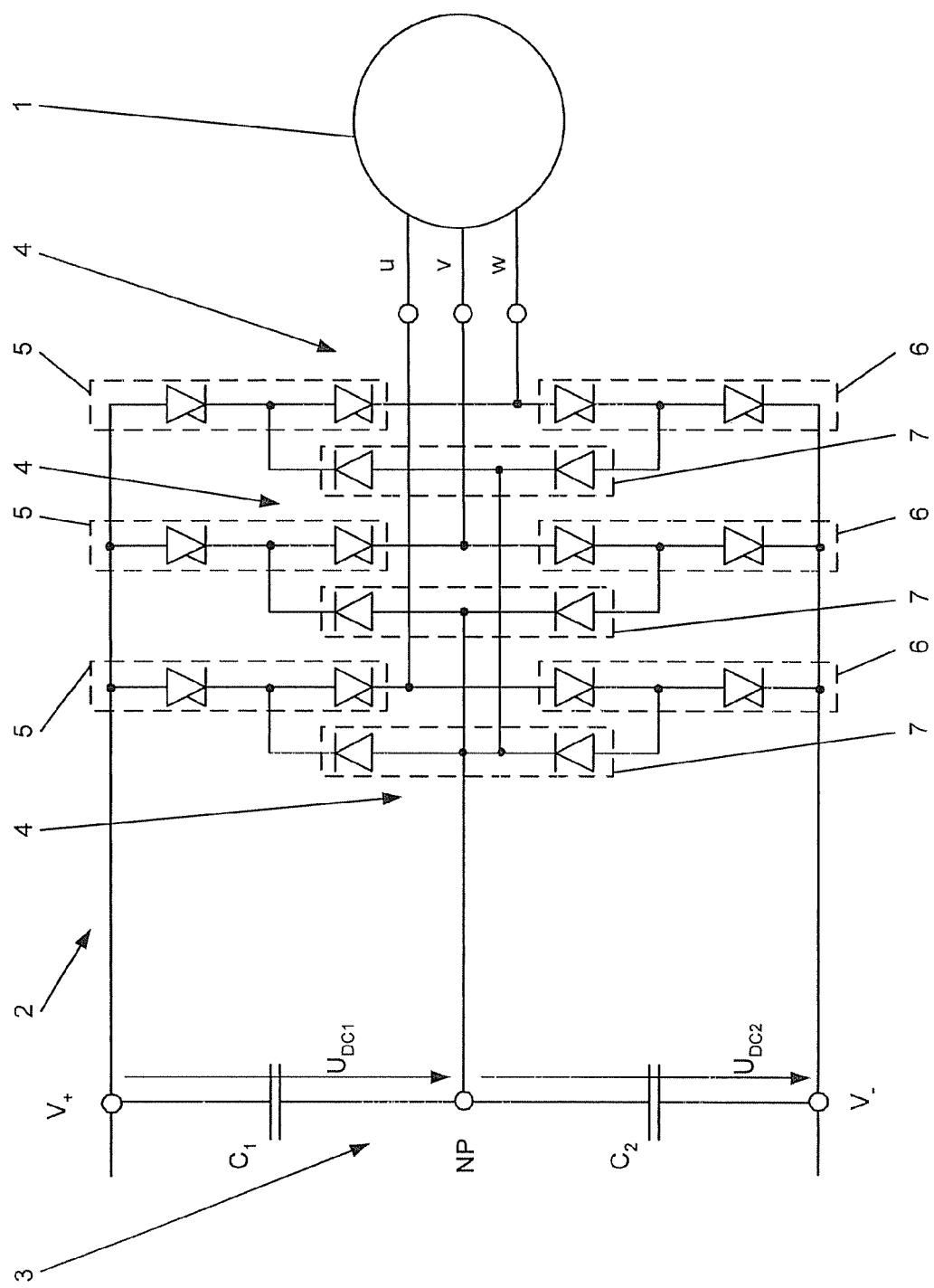
FIG. 1 shows an exemplary embodiment of a three-phase converter circuit for connecting three voltage levels.

The references used in the drawing and their significance are listed by way of summary in the list of references. In principle, identical parts are provided with the same references in the figures. The embodiments described represent examples of the subject matter of the disclosure and have no restrictive effect.

DETAILED DESCRIPTION

In the method according to the disclosure for operating a rotating electrical machine, the rotating electrical machine is connected in terms of phase to a converter circuit, having a DC voltage circuit, for connecting m voltage levels, where m≧2. In accordance with the method, in one step (a) the phases of the converter circuit are connected to the DC voltage circuit in accordance with a selected switching state combination of switching states for power semiconductor switches in the converter circuit. The selection of this switching state combination takes place in the following further steps:

(b) beginning with a starting sampling time k for a selectable number L of sampling times: determination of all the switching state combinations at each of the L sampling times, where L≧1, (c) formation of switching state sequences for each determined switching state combination at the starting sampling time k, each switching state sequence being an arrangement of determined switching state combinations of the L sampling times next to one another in a row, said switching state combinations being associated with the respective switching state combination at the starting sampling time k, and (d) for each of the switching state sequences, calculation of a torque trajectory of the rotating electrical machine and a magnetic stator flux trajectory of the rotating electrical machine from determined state value sets of the rotating electrical machine and the converter circuit for the starting sampling time k up to the sampling time k+L.

According to the disclosure, the selection of switching state combination now takes place in accordance with the following further steps:

(e) if the torque trajectory at the k-th sampling time exceeds a predetermined upper value range limit or falls below a predetermined lower value range limit, calculation of a torque infringement value based on the upper and lower value range limits for the sampling time k up to the sampling time k+L, (f) if the magnetic stator flux trajectory at the k-th sampling time exceeds a predetermined upper value range limit or falls below a predetermined lower value range limit, calculation of a stator flux infringement value based on the upper and lower value range limits for the sampling time k up to the sampling time k+L, (g) for each switching state sequence and for the sampling time k up to the sampling time k+L, determination of the maximum value from the torque infringement values and the stator flux infringement values, (h) for each switching state sequence, formation of the sum of the maximum values, (i) setting that determined switching state combination at the starting sampling time k as the selected switching state combination with which the sum of the maximum values is at its smallest, (j) repetition of steps (a) to (i), where k=k+1.

As an alternative to the abovementioned steps (g) to (i), the selection of the switching state combination can also take place in accordance with the following further steps:

(g) for each switching state sequence and for the sampling time k up to the sampling time k+L, formation of the sum of the torque infringement values and formation of the sum of the stator flux infringement values, (h) for each switching state sequence, formation of the maximum value from the sum of the torque infringement values and the sum of the stator flux infringement values, (i) setting that determined switching state combination at the starting sampling time k as the selected switching state combination with which the maximum value is at its smallest.

By means of steps (e) to (j), for the case in which the respectively associated torque trajectory or the magnetic stator flux trajectory is outside the predetermined value range, the optimum switching state combination is always advantageously selected. The method according to the disclosure is therefore capable of handling switching state combinations with a respectively associated torque trajectory and magnetic stator flux trajectory which are outside the predetermined value range. Accordingly, unrestricted operation of the rotating electrical machine is now possible.

FIG. 1 shows an exemplary embodiment of a three-phase converter circuit 2 for connecting three voltage levels, a rotating electrical machine 1 being connected in terms of phase to a DC voltage circuit 3 of the converter circuit 2. In general, the rotating electrical machine 1 can be connected to a converter circuit 2 for connecting m voltage levels, in this case m≧2. In accordance with FIG. 1, the DC voltage circuit 3 is formed by a first capacitor $C_1$ and by a second capacitor $C_2$ which is connected in series with the first capacitor $C_1$, $C_1$ being essentially equal in value to $C_2$. The DC voltage circuit 3 in accordance with the exemplary embodiment of a converter circuit for connecting three voltage levels as shown in FIG. 1 has a first main connection $V_+$ at the first capacitor $C_1$, a second main connection $V_-$ at the second capacitor $C_2$ and a subconnection NP formed by the two series-connected capacitors $C_1$, $C_2$. Furthermore, the converter circuit shown in FIG. 1 comprises a part-converter system 4, which is provided for each phase u, v, w and in each case is formed by a first switching group 5, by a second switching group 6 and by a third switching group 7, each switching group 5, 6, 7 being formed by two series-connected power semiconductor switches. Furthermore, in each part-converter system 4, the first switching group 5 is connected to the first main connection $V_+$, and the second switching group 6 is connected to the second main connection $V_-$. In addition, the first switching group 5 is connected in series with the second switching group 6, the connection point between the first switching group 5 and the second switching group 6 forming a phase connection. The third switching group 7, which is in the form of a clamping switching group, is connected to the first switching group 5, in particular to the connection point between the two series-connected power semiconductor switches of the first switching group 5. In addition, the third switching group 7 is connected to the second switching group 6, in particular to the connection point between the two series-connected power semiconductor switches of the second switching group 6. Furthermore, the third switching group 7, in particular the connection point between the two series-connected power semiconductor switches of the third switching group 7, is connected to the subconnection NP. The power semiconductor switches of the first and second switching groups 5, 6 are, as shown in FIG. 1, in the form of drivable bidirectional power semiconductor switches, the power semiconductor switches of the third switching group 7 being in the form of unidirectional nondrivable power semiconductor switches. However, it is also conceivable for the power semiconductor switches of the third switching group 7 to also be in the form of drivable bidirectional power semiconductor switches.

Figure 2:
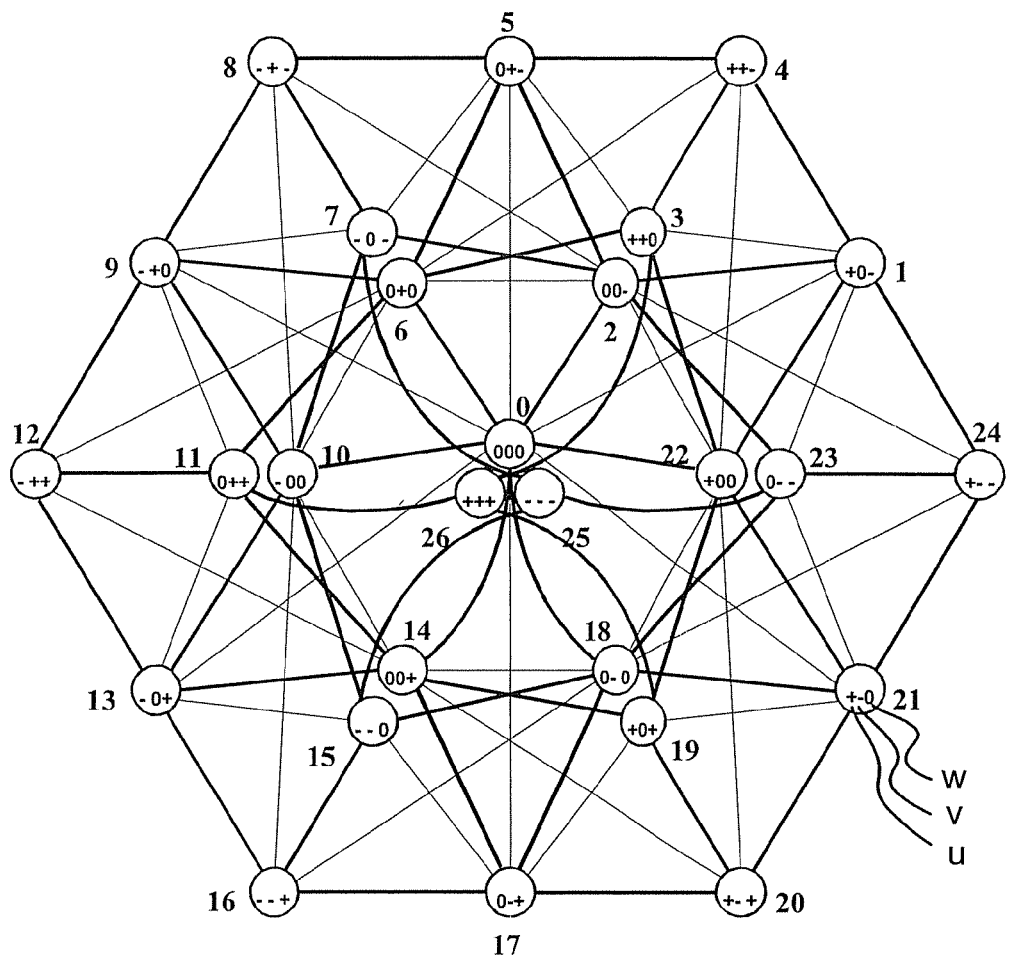
FIG. 2 shows a state diagram having switching state combinations of the phases of the converter circuit.

According to the method, the phases u, v, w of the converter circuit 2, which is generally a converter circuit 2 for connecting m voltage levels, are now connected, in a first step (a), to the DC voltage circuit 3 in accordance with a selected switching state combination $SK_{a,k}$ of switching states for the power semiconductor switches in the converter circuit 2. As has already been mentioned at the outset, FIG. 2 shows, by way of example, a state diagram of switching state combinations of a converter circuit 2 for connecting m=3 voltage levels, "+" representing a connection of the corresponding phase u, v, w to the first main connection $V_+$, "−" representing a connection of the corresponding phase u, v, w to the second main connection V and "0" representing a connection of the corresponding phase u, v, w to the subconnection NP, and the lines between the switching state combinations SK representing permissible transitions between the switching state combinations SK. Mention will be made of the fact that a state diagram of switching state combinations of a converter circuit 2, for example, for connecting m=5 voltage levels would be represented differently. In particular, those skilled in the art can reliably implement a converter circuit in which, on the basis of a switching state combination SK, all possible switchable switching state combinations SK of this converter circuit can be switched, without restriction.

Moreover, the selection of the abovementioned switching state combination $SK_{a,k}$ takes place in the further steps described in detail below. In step (b), beginning with a starting sampling time k for a selectable number L of sampling times, all the switching state combinations $SK_k, \ldots, SK_{k+L}$ are determined at each of the L sampling times, e.g., starting from the respectively preceding determined switching state combination $SK_{k-1}$, where L≧1, and where the first preceding determined switching state combination $SK_{k-1}$ is, e.g., the preceding selected switching state combination $SK_{a,k-1}$, i.e. at sampling time k−1. In step (c), for each determined switching state combination $SK_k$ at the starting sampling time k switching state sequences SSK are formed, each switching state sequence SSK being an arrangement of determined switching state combinations $SK_k, \ldots, SK_{k+L}$ of the L sampling times next to one another in a row, said switching state combinations $SK_k, \ldots, SK_{k+L}$ being associated with the respective switching state combination $SK_k$ at the starting sampling time k. As can be seen in the illustrations, such a switching state sequence SSK represents, by way of example, a series of possible switching state combinations $SK_k, \ldots, SK_{k+L}$ in accordance with FIG. 2 along the associated lines to one of the possible switching state combinations $SK_k$ at the starting sampling time k. In step (d), for each of the switching state sequences SSK, a torque trajectory M of the rotating electrical machine 1 and a magnetic stator flux trajectory ϕ of the rotating electrical machine 1 is calculated from determined state value sets $X_{e,k}, \ldots, X_{e,k+L}$ of the rotating electrical machine 1 and the converter circuit 2 for the starting sampling time k up to the sampling time k+L. Each of the abovementioned determined state value sets $X_{e,k}, \ldots, X_{e,k+L}$ contains, for example, two stator flux values $\phi_{eS1,k}, \ldots, \phi_{eS1,k+L}; \phi_{eS2,k}, \ldots, \phi_{eS2,k+L}$, two rotor flux values $\phi_{e,R1,k}, \ldots, \phi_{eR1,k+L}; \phi_{eR2,k}, \ldots, \phi_{eR2,k+L}$ and possibly a speed value $V_{e,k}, \ldots, V_{e,k+L}$. In order to determine the state value sets $X_{e,k}, \ldots, X_{e,k+L}$, initially the two stator flux values $\phi_{eS1,k}; \phi_{e,S2,k}$ at the sampling time k, the two rotor flux values $\phi_{eR1,k}; \phi_{eR,2,k}$ at the sampling time k and possibly the speed value $V_{e,k}$ at the sampling time k are determined, for example, by measurement or estimation, these values forming the state value set $X_{e,k}$ at the sampling time k. From the state value set $X_{e,k}$ at the sampling time k, trajectory values $M_{T,k}; \phi_{T,k}$ at the sampling time k of the torque trajectory M and the magnetic stator flux trajectory ϕ are then calculated according to a calculation model known to those skilled in the art which describes or functionally simulates the electrical machine 1 and the converter circuit 2. Then, in accordance with the calculation model, the state value set $X_{e,k+1}$ at the sampling time k+1 is determined by calculation as a function of the state value set $X_{e,k}$ at the sampling time k and as a function of the determined switching state combinations $SK_k$ at the sampling time k of the associated switching state sequence SSK and, from this, the trajectory values $M_{T,k+1}$; $\phi_{T,k+L}$ for the k+1 of the torque trajectory M and the magnetic stator flux trajectory $\phi$ are then calculated. The calculation of the state value sets $X_{e,k+2}, \ldots, X_{e,k+L}$ for the sampling times k+2 to k+L takes place in analogy to the above-explained calculation of the state value set $X_{e,k+1}$, in which case, for each calculation of the state value sets $X_{e,k+2}, \ldots, X_{e,k+L}$, in each case the associated preceding calculated state value sets $X_{e,k+1}, \ldots, X_{e,k+L-1}$ and the determined switching state combinations $SK_{k+1}, \ldots, SK_{k+L-1}$ at the sampling time k+1 to k+L-1 of the associated switching state sequence SSK are used. The calculation, following from the state value sets $X_{e,k+2}, \ldots, X_{e,k+L}$, of the trajectory values $M_{T,k+2}, \ldots, M_{T,k+L}$; $\phi_{T,k+2}, \ldots \phi_{T,k+L}$ for the sampling. times k+2 to k+L likewise takes place in analogy to the above-described calculation of the trajectory values $M_{T,k}$; $\phi_{T,k}$; $M_{T,k\ 1}$ for the sampling times k and k+1. Owing to the above-described calculation of the trajectory values $M_{T,k}, \ldots, M_{T,k+L}$; $\phi_{T,k}, \ldots, \phi_{T,k+L}$, said torque trajectory M of the rotating electrical machine 1 and a magnetic stator flux trajectory $\phi$ of the rotating electrical machine 1 result for each switching state sequence SSK, a schematic profile being shown in FIG. 3 by way of example of such calculated torque trajectories M of associated switching state sequences SSK for L=3 sampling times and, in this case, the points of the torque trajectories M corresponding to the associated determined trajectory values $M_{T,k}, \ldots, M_{T,k+L}$. Mention will be made of the fact that, initially, all of the state value sets $X_{e,k}, \ldots, X_{e,k+L}$ for the sampling times k to k+L can also be determined in accordance with the above-explained procedure and, accordingly, the respective trajectory values $M_{T,k}, \ldots, M_{T,k+L}$; $\phi_{T,k}, \ldots, \phi_{T,k+L}$ for the sampling times k to k+L are then calculated therefrom for the purpose of forming the torque trajectory M and the magnetic stator flux trajectory $\phi$ according to the above procedure.

Figure 3:
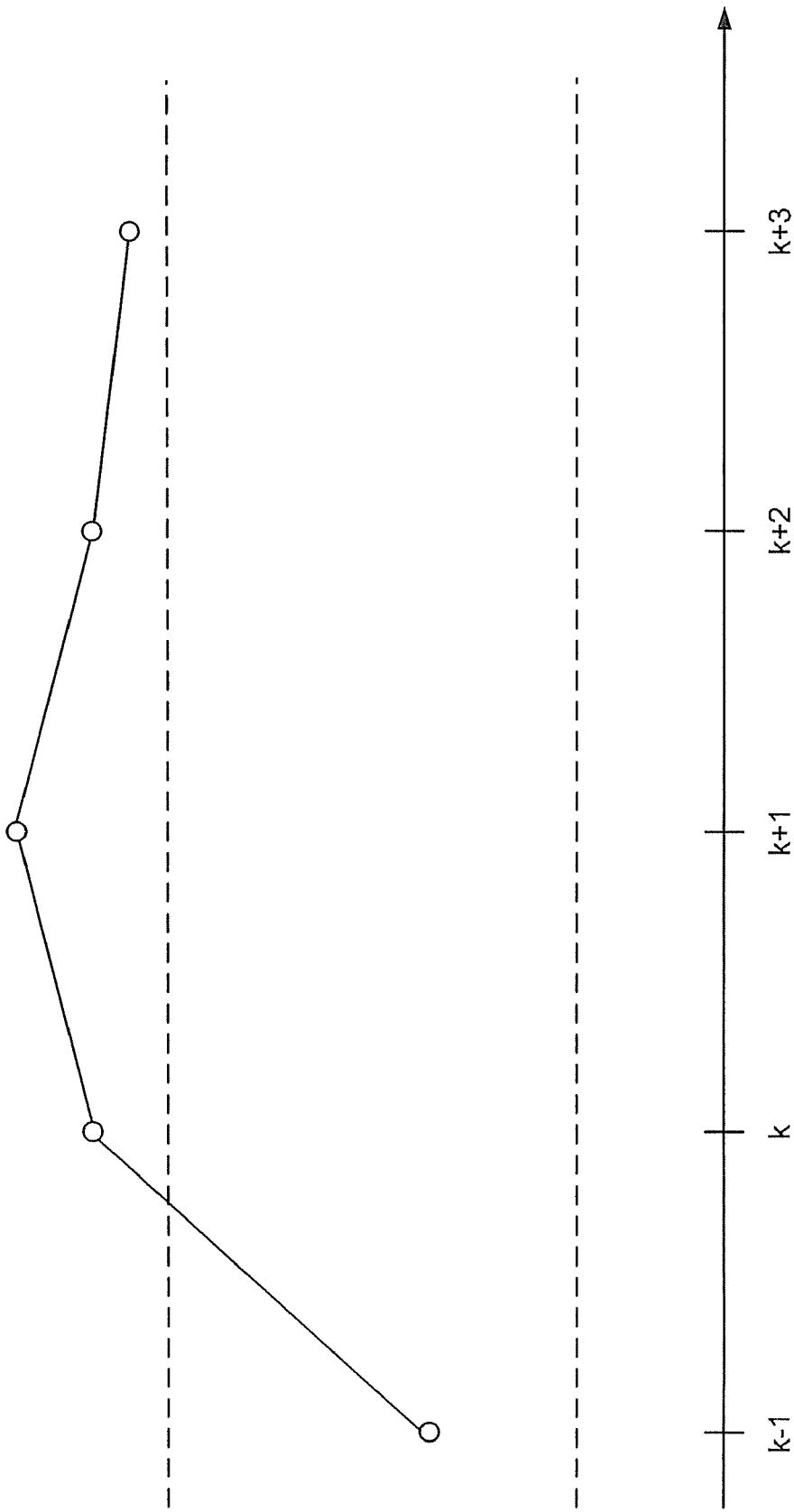
FIG. 3 shows a schematic profile of a calculated torque trajectory for L=3 sampling times.

According to the disclosure, in the further step (e), if the torque trajectory M at the k-th sampling time exceeds a predetermined upper value range limit $y_{M,max}$ or falls below a predetermined lower value range limit $y_{M,min}$, a torque infringement value $v_{M,k}, \ldots, v_{M,k+L}$ based on the upper and lower value range limits $y_{M,min}, y_{M,max}$ for the sampling time k up to the sampling time k+L is calculated. In FIG. 3, the predetermined value range with the upper and lower value range limits $y_{M,min}, y_{M,max}$ is indicated by the two dashed horizontal lines. Mention will be made of the fact that the respectively predetermined value range is time-variant and is usually determined by an upstream closed-loop control circuit from reference values for the torque of the rotating electrical machine 1 and the magnetic stator flux of the rotating electrical machine 1, such closed-loop control circuits being known to those skilled in the art. Furthermore, in step (f), if the magnetic stator flux trajectory $\phi$ at the k-th sampling time exceeds a predetermined upper value range limit $y_{S,max}$ or falls below a predetermined lower value range limit $y_{S,min}$, a stator flux infringement value $v_{S,k}, \ldots, v_{S,k+L}$ based on the upper and lower value range limits $y_{S,min}, y_{S,max}$ for the sampling time k up to the sampling time k+L is calculated. In step (g), for each switching state sequence SSK and for the sampling time k up to the sampling time k+L, the maximum value $v_{max}$ is then determined from the torque infringement values $v_{M,k}, \ldots, v_{M,k+L}$ and the stator flux infringement values $v_{S,k}, \ldots, v_{S,k+L}$. In step (h), for each switching state sequence SSK, the sum $S_{vmax}$ of the maximum values $v_{max}$ is subsequently formed. In a further step (i), that determined switching state combination $SK_k$ at the starting sampling time k is then set as the selected switching state combination $SK_{a,k}$ with which the sum $S_{vmax}$ of the maximum values $v_{max}$ is at its smallest.

As an alternative to the abovementioned steps (g) to (i), the selection of switching state combination $SK_{a,k}$ can also take place in accordance with the following further steps:

(g) for each switching state sequence SSK and for the sampling time k up to the sampling time k+L, formation of the sum $S_{M,v}$ of the torque infringement values $v_{M,k}, \ldots, v_{M,k+L}$ and formation of the sum $S_{S,v}$ of the stator flux infringement values $v_{S,k}, \ldots, v_{S,k+L}$, (h) for each switching state sequence SSK, formation of the maximum value $v_{max}$ from the sum $S_{M,v}$ of the torque infringement values $v_{M,k}, \ldots, v_{M,k+L}$ and the sum $S_{S,v}$ of the stator flux infringement values $v_{S,k}, \ldots, v_{S,k+L}$, (i) setting that determined switching state combination $SK_k$ at the starting sampling time k as the selected switching state combination $SK_{a,k}$ with which the maximum value $v_{max}$ is at its smallest.

Finally, in step (j), the steps (a) to (i) are repeated, where k=k+1, i.e. the selection of the switching state combination $SK_{a,k}$ takes place, for k=k+1, in accordance with the sequence described above according to steps (a) to (i). L is constant for each of steps (a) to (j).

By means of steps (e) to (j), for the case in which the respectively associated torque trajectory M or the magnetic stator flux trajectory $\phi$ is outside the predetermined value range, the optimum switching state combination $SK_{a,k}$ is always advantageously selected. The method according to the disclosure is therefore capable of handling switching state combinations with a respectively associated torque trajectory M and magnetic stator flux trajectory $\phi$ which are outside the predetermined value range. Accordingly, unrestricted operation of the rotating electrical machine 1 is advantageously possible.

Mention will be made of the fact that steps (a) to (j) can be implemented in the form of software and this software can then be loaded, for example, onto a computer system, in particular using a digital signal processor, and run on this computer system.

As mentioned above, FIG. 1 shows a converter circuit 2 for connecting m=3 voltage levels, the DC voltage circuit 3 then having m-2 subconnections NP, i.e. a single subconnection NP. For the general case of a converter circuit 2 for connecting m voltage levels, where m≧3, the converter circuit 2 then has m-2 subconnections NP at the DC voltage circuit 3. With respect to step (d) of the method according to the disclosure, this means that, for each of the switching state sequences SSK, in addition m-2 potential trajectories $U_{NP}$ for potentials at the m-2 subconnections NP are calculated from determined state value sets $X_{e,k}, \ldots, X_{e,k+L}$ of the rotating electrical machine 1 and the converter circuit 2 for the starting sampling time k up to the sampling time k+L. The mentioned calculation of the m-2 potential trajectories $U_{NP}$ takes place in analogy to the calculation explained above for the corresponding torque trajectory M of the rotating electrical machine 1 and magnetic stator flux trajectory $\phi$ of the rotating electrical machine 1. Furthermore, for m≧3, with respect to step (e), if the m-2 potential trajectories $U_{NP}$ at the k-th sampling time exceed a predetermined upper value range limit $y_{NP,max}$ or fall below a predetermined lower value range limit $y_{Np,min}$, a potential infringement value $v_{NP,k}, \ldots, v_{NP,k+L}$ based on the upper and lower value range limits $y_{NP,min}, y_{NP,max}$ for the sampling time k up to the sampling time k+L is calculated for each potential trajectory $U_{NP}$, and, with respect to step (g), for each switching state sequence SSK and for the sampling time k up to the sampling time k+L, the maximum value $v_{max}$ is then additionally determined from the potential infringement values $v_{Np,k}, \ldots, v_{Np,k+L}$.

It goes without saying that, for $m \geq 3$, steps (a) to (c) and (h) to (j) are maintained. Mention is made of the fact that, for $m \geq 3$, steps (d), (e) and (g) can likewise be realized in the form of software and this software can then be loaded, for example, onto a computer system, in particular with a digital signal processor, and then run on this system.

As an alternative, for $m \geq 3$, with respect to step (g), for each switching state sequence SSK and for the sampling time k up to the sampling time k+L, in addition the sum $S_{NP,v}$ of the potential infringement values $v_{NP,k}, \ldots, v_{NP,k+L}$ is formed and, with respect to step (h), for each switching state sequence SSK, the maximum value $v_{max}$ is then additionally formed from the sum $S_{NP,v}$ of the potential infringement values $v_{NP,k}, \ldots, v_{NP,k+L}$.

It goes without saying that, in this alternative, for $m \geq 3$, steps (a) to (c) and (i) to (j) are maintained, and steps (g) and (h) can then likewise be realized in the form of software and this software can then be loaded, for example, onto a computer system, in particular with a digital signal processor, and then run on this system.

More details will be given below on the calculation of the torque infringement values $v_{M,k}, \ldots, v_{M,k+L}$, the stator flux infringement values $v_{S,k}, \ldots, v_{S,k+L}$ and the potential infringement values $v_{NP,k}, \ldots, v_{NP,k+L}$. If the torque trajectory M at the k-th sampling time exceeds the predetermined upper value range limit $y_{M,max}$, the calculation of the torque infringement value $v_{M,k}, \ldots, v_{M,k+L}$ based on the upper and lower value range limits $y_{M,min}, y_{M,max}$ for the sampling time k up to the sampling time k+L is done in accordance with the following formula $$v_{M,k}, \ldots, v_{M,k+L} = \frac{M_{T,k}, \ldots, M_{T,k+L} - y_{M,max}}{y_{M,max} - y_{M,min}}.$$

If, on the other hand, the torque trajectory M at the k-th sampling time falls below the predetermined lower value range limit $Y_{M,min}$, the calculation of the torque infringement value $v_{M,k}, \ldots, v_{M,k+L}$ based on the upper and lower value range limits $y_{M,min}, Y_{M,max}$ for the sampling time k up to the sampling time k+L is done in accordance with the following formula $$v_{M,k}, \ldots, v_{M,k+L} = \frac{y_{M,min} - M_{T,k}, \ldots, M_{T,k+L}}{y_{M,max} - y_{M,min}}.$$

Here, $M_{T,k}, \ldots, M_{T,k+L}$ are the trajectory values of the torque trajectory M for the sampling time k up to the sampling time k+L.

If the magnetic stator flux trajectory $\phi$ at the k-th sampling time exceeds the predetermined upper value range limit $y_{S,max}$, the calculation of the stator flux infringement value $v_{S,k}, \ldots, v_{S,k+L}$ based on the upper and lower value range limits $y_{S,min}, y_{S,max}$ for the sampling time k up to the sampling time k+L is done in accordance with the following formula $$v_{S,k}, \ldots, v_{S,k+L} = \frac{\Phi_{T,k}, \ldots, \Phi_{T,k+L} - y_{S,max}}{y_{S,max} - y_{S,min}}.$$

If, on the other hand, the magnetic stator flux trajectory $\phi$ at the k-th sampling time falls below the predetermined lower value range limit $y_{S,min}$, the calculation of the stator flux infringement value $v_{S,k}, \ldots, v_{S,k+L}$ based on the upper and lower value range limits $y_{S,min}, y_{S,max}$ for the sampling time k up to the sampling time k+L is done in accordance with the following formula $$v_{S,k}, \ldots, v_{S,k+L} = \frac{y_{S,min} - \Phi_{T,k}, \ldots, \Phi_{T,k+L}}{y_{S,min} - y_{S,min}}.$$

Here, $\phi_{T,k}, \ldots, \phi_{T,k+L}$ are the trajectory values of the magnetic stator flux trajectory $\phi$ for the sampling time k up to the sampling time k+L.

If the m−2 potential trajectories $U_{NP}$ at the k-th sampling time exceed the predetermined upper value range limit $y_{Np,max}$, the calculation of the potential infringement value $v_{NP,k}, \ldots, v_{NP,k+L}$ based on the upper and lower value range limits $y_{Np,min}, y_{NP,max}$ for the sampling time k up to the sampling time k+L is done in accordance with the following formula $$v_{NP,k}, \ldots, v_{NP,k+L} = \frac{U_{T,k}, \ldots, U_{T,k+L} - y_{NP,max}}{y_{NP,max} - y_{NP,min}}.$$

If, on the other hand, the m−2 potential trajectories $U_{NP}$ at the k-th sampling time fall below the predetermined lower value range limit $y_{NP,min}$, the calculation of the potential infringement value $v_{NP,k}, \ldots, v_{NP,k+L}$ based on the upper and lower value range limits $y_{NP,min}, y_{NP,max}$ for the sampling time k up to the sampling time k+L is done in accordance with the following formula $$v_{NP,k}, \ldots, v_{NP,k+L} = \frac{y_{NP,min} - U_{T,k}, \ldots, U_{T,k+L}}{y_{NP,max} - y_{NP,min}},$$

where $U_{T,k}, \ldots, U_{T,k+L}$ are the trajectory values of the m−2 potential trajectories $U_{NP}$ for the sampling time k up to the sampling time k+L.

For reasons of completeness, mention is made of the fact that if the respective trajectory for the k-th sampling time is generally within the range formed by the associated upper and lower value range limits, the associated infringement value at the sampling time k up to the sampling time k+L is set to zero.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCES

1 Rotating electrical machine
2 Converter circuit for connecting three voltage levels
3 DC voltage circuit
4 Part-converter system
5 First switching group
6 Second switching group
7 Third switching group

What is claimed is:

1. An arrangement for operating a rotating electrical machine, comprising:
 a converter circuit connected by phase to the rotating electrical machine; and
 a DC voltage circuit for connecting at least two voltage levels, the phases of the converter circuit being connected to the DC voltage circuit in accordance with a selected switching state combination of switching states for power semiconductor switches in the converter circuit, wherein over a number L of sampling times a maximum value is determined from torque infringement values and another maximum value is determined from stator flux infringement values and these maximum values are added, and the switching state combination is set as the selected switching state combination with which the sum of the maximum values is at its smallest.

2. The arrangement as claimed in claim 1, wherein said torque trajectory or magnetic stator flux trajectory are outside a predetermined value range.

3. An arrangement for operating a rotating electrical machine, comprising:
 a converter circuit connected by phase to the rotating electrical machine; and
 a DC voltage circuit for connecting at least two voltage levels, the phases of the converter circuit being connected to the DC voltage circuit in accordance with a selected switching state combination of switching states for power semiconductor switches in the converter circuit, wherein over a number L of sampling times a sum of torque infringement values and a sum of stator flux infringement values is formed, a maximum value of the sums is formed, and the switching state combination is set as the selected switching state combination with which the maximum value is at its smallest.

4. The arrangement as claimed in claim 3, wherein said torque trajectory or magnetic stator flux trajectory are outside a predetermined value range.

5. A method for operating a rotating electrical machine, the rotating electrical machine being connected in terms of phase to a converter circuit, having a DC voltage circuit, for connecting m voltage levels, where $m \geq 2$, having the following steps
 (a) connection of the phases (u, v, w) of the converter circuit to the DC voltage circuit in accordance with a selected switching state combination ($SK_{a,k}$) of switching states for power semiconductor switches in the converter circuit, the selection of the switching state combination ($SK_{a,k}$) takes place in the following further steps:
 (b) beginning with a starting sampling time k for a selectable number L of sampling times: determination of all the switching state combinations ($SK_k, \ldots, SK_{k+L}$) at each of the L sampling times, where $L \geq 1$,
 (c) formation of switching state sequences (SSK) for each determined switching state combination ($SK_k$) at the starting sampling time k, each switching state sequence (SSK) being an arrangement of determined switching state combinations ($SK_k, \ldots, SK_{k+L}$) of the L sampling times next to one another in a row, said switching state combinations ($SK_k, \ldots, SK_{k+L}$) being associated with the respective switching state combination ($SK_k$) at the starting sampling time k,
 (d) for each of the switching state sequences (SSK), calculation of a torque trajectory (M) of the rotating electrical machine and a magnetic stator flux trajectory ($\phi$) of the rotating electrical machine from determined state value sets ($X_{e,k}, \ldots, X_{e,k+L}$) of the rotating electrical machine and the converter circuit for the starting sampling time k up to the sampling time k+L,
 (e) if the torque trajectory (M) at the k-th sampling time exceeds a predetermined upper value range limit ($y_{M,max}$) or falls below a predetermined lower value range limit ($y_{M,min}$), calculation of a torque infringement value ($v_{M,k}, \ldots, v_{M,k+L}$) based on the upper and lower value range limits ($y_{M,min}, y_{M,max}$) for the sampling time k up to the sampling time k+L,
 (f) if the magnetic stator flux trajectory ($\phi$) at the k-th sampling time exceeds a predetermined upper value range limit ($y_{S,max}$) or falls below a predetermined lower value range limit ($y_{S,min}$), calculation of a stator flux infringement value ($v_{S,k}, \ldots, v_{S,k+L}$) based on the upper and lower value range limits ($y_{S,min}, y_{S,max}$) for the sampling time k up to the sampling time k+L,
 (g) for each switching state sequence (SSK) and for the sampling time k up to the sampling time k+L, determination of the maximum value ($v_{max}$) from the torque infringement values ($v_{M,k}, \ldots, v_{M,k+L}$) and the stator flux infringement values ($v_{S,k}, \ldots, v_{S,k+L}$),
 (h) for each switching state sequence (SSK), formation of the sum ($S_{vmax}$) of the maximum values ($v_{max}$),
 (i) setting that determined switching state combination ($SK_k$) at the starting sampling time k as the selected switching state combination ($SK_{a,k}$) with which the sum ($S_{vmax}$) of the maximum values ($v_{max}$) is at its smallest,
 (j) repetition of steps (a) to (i), where k=k+1.

6. The method as claimed in claim 5, wherein, for $m \geq 3$, the converter circuit for connecting m voltage levels has m−2 subconnections (NP) at the DC voltage circuit and, with respect to
 step (d), for each of the switching state sequences (SSK), in addition m−2 potential trajectories ($U_{NP}$) for potentials at the m−2 subconnections (NP) are calculated from determined state value sets ($X_{e,k}, \ldots, X_{e,k+L}$) of the rotating electrical machine and the converter circuit for the starting sampling time k up to the sampling time k+L, wherein, with respect to step (e), if the m−2 potential trajectories ($U_{NP}$) at the k-th sampling time exceed a predetermined upper value range limit ($y_{Np,max}$) or fall below a predetermined lower value range limit ($y_{Np,min}$), a potential infringement value ($v_{Np,k}, \ldots, v_{Np,k+L}$) based on the upper and lower value range limits ($y_{NP,min}, y_{Np,max}$) for the sampling time k up to the sampling time k+L is calculated for each potential trajectory ($U_{NP}$), and, with respect to step (g), for each switching state sequence (SSK) and for the sampling time k up to the sampling time k+L, the maximum value ($v_{max}$) is then additionally determined from the potential infringement values ($v_{Np,k}, \ldots, v_{Np,k+L}$).

7. The method as claimed in claim 6, wherein, if the m−2 potential trajectories ($U_{NP}$) at the k-th sampling time exceed the predetermined upper value range limit ($y_{NP,max}$), the calculation of the potential infringement value ($v_{Np,k}, \ldots, v_{Np,k+L}$) based on the upper and lower value range limits ($y_{NP,min}, y_{NP,max}$) for the sampling time k up to the sampling time k+L is done in accordance with the following formula $$v_{NP,k}, \ldots, v_{NP,k+L} = \frac{U_{T,k}, \ldots, U_{T,k+L} - y_{NP,max}}{y_{NP,max} - y_{NP,min}},$$

and wherein,
 if the m−2 potential trajectories ($U_{NP}$) at the k-th sampling time fall below the predetermined lower value range limit ($y_{NP,min}$), the calculation of the potential infringement value ($v_{NP,k}, \ldots, v_{NP,k+L}$) based on the upper and lower value range limits ($y_{NP,min}, y_{NP,max}$) for the sampling time k up to the sampling time k+L is done in accordance with the following formula $$v_{NP,k}, \ldots, v_{NP,k+L} = \frac{y_{NP,\min} - U_{T,k}, \ldots, U_{T,k+L}}{y_{NP,\max} - y_{NP,\min}},$$

where $U_{T,k}, \ldots, U_{T,k+L}$ are the trajectory values of the m−2 potential trajectories ($U_{NP}$) for the sampling time k up to the sampling time k+L.

8. The method as claimed in claim 5, wherein if the torque trajectory (M) at the k-th sampling time exceeds the predetermined upper value range limit ($y_{M,max}$), the calculation of the torque infringement value ($v_{M,k}, \ldots, v_{M,k+L}$) based on the upper and lower value range limits ($y_{M,min}, y_{M,max}$) based on the upper and lower value range limits ($y_{NP,min}, y_{NP,max}$) for the sampling time k up to the sampling time k+L is done in accordance with the following formula $$v_{M,k}, \ldots, v_{M,k+L} = \frac{M_{T,k}, \ldots, M_{T,k+L} - y_{M,\max}}{y_{M,\max} - y_{M,\min}},$$

and wherein,
if the torque trajectory (M) at the k-th sampling time falls below the predetermined lower value range limit ($y_{M,min}$), the calculation of the torque infringement value ($v_{M,k}, \ldots, v_{M,k+L}$) based on the upper and lower value range limits ($y_{M,min}, y_{M,max}$) for the sampling time k up to the sampling time k+L is done in accordance with the following formula $$v_{M,k}, \ldots, v_{M,k+L} = \frac{y_{M,\min} - M_{T,k}, \ldots, M_{T,k+L}}{y_{M,\max} - y_{M,\min}},$$

where $M_{T,k}, \ldots, M_{T,k+L}$ are the trajectory values of the torque trajectory (M) for the sampling time k up to the sampling time k+L.

9. The method as claimed in claim 5, wherein if the magnetic stator flux trajectory (φ) at the k-th sampling time exceeds the predetermined upper value range limit ($y_{S,max}$), the calculation of the stator flux infringement value ($v_{S,k}, \ldots, v_{S,k+L}$) based on the upper and lower value range limits ($y_{S,min}, y_{S,max}$) for the sampling time k up to the sampling time k+L is done in accordance with the following formula $$v_{S,k}, \ldots, v_{S,k+L} = \frac{\Phi_{T,k}, \ldots, \Phi_{T,k+L} - y_{S,\max}}{y_{S,\max} - y_{S,\min}},$$

and wherein,
if the magnetic stator flux trajectory (φ) at the k-th sampling time falls below the predetermined lower value range limit ($y_{S,min}$), the calculation of the stator flux infringement value ($v_{S,k}, \ldots, v_{S,k+L}$) based on the upper and lower value range limits ($y_{S,min}, y_{S,max}$) for the sampling time k up to the sampling time k+L is done in accordance with the following formula $$v_{S,k}, \ldots, v_{S,k+L} = \frac{y_{S,\min} - \Phi_{T,k}, \ldots, \Phi_{T,k+L}}{y_{S,\max} - y_{S,\min}},$$

where $\phi_{T,k}, \ldots, \phi_{T,k+L}$ are the trajectory values of the magnetic stator flux trajectory (φ) for the sampling time k up to the sampling time k+L.

10. A method for operating a rotating electrical machine, the rotating electrical machine being connected in terms of phase to a converter circuit, having a DC voltage circuit, for connecting m voltage levels, where m≧2, having the following steps
 (a) connection of the phases (u, v, w) of the converter circuit to the DC voltage circuit in accordance with a selected switching state combination ($SK_{a,k}$) of switching states for power semiconductor switches in the converter circuit, the selection of the switching state combination ($SK_{a,k}$) takes place in the following further steps:
 (b) beginning with a starting sampling time k for a selectable number L of sampling times: determination of all the switching state combinations ($SK_k, \ldots, SK_{k+L}$) at each of the L sampling times, where L≧1,
 (c) formation of switching state sequences (SSK) for each determined switching state combination ($SK_k$) at the starting sampling time k, each switching state sequence (SSK) being an arrangement of determined switching state combinations ($SK_k, \ldots, SK_{k+L}$) of the L sampling times next to one another in a row, said switching state combinations ($SK_k, \ldots, SK_{k+L}$) being associated with the respective switching state combination ($SK_k$) at the starting sampling time k,
 (d) for each of the switching state sequences (SSK), calculation of a torque trajectory (M) of the rotating electrical machine and a magnetic stator flux trajectory (φ) of the rotating electrical machine (1) from determined state value sets ($X_{e,k}, \ldots, X_{e,k+L}$) of the rotating electrical machine and the converter circuit for the starting sampling time k up to the sampling time k+L,
 (e) if the torque trajectory (M) at the k-th sampling time exceeds a predetermined upper value range limit ($y_{M,max}$) or falls below a predetermined lower value range limit ($y_{M,min}$), calculation of a torque infringement value ($v_{M,k}, \ldots v_{M,k+L}$) based on the upper and lower value range limits ($y_{M,min}, y_{M,max}$) for the sampling time k up to the sampling time k+L,
 (f) if the magnetic stator flux trajectory (φ) at the k-th sampling time exceeds a predetermined upper value range limit ($y_{S,max}$) or falls below a predetermined lower value range limit ($y_{S,min}$), calculation of a stator flux infringement value ($v_{S,k}, \ldots, v_{S,k+L}$) based on the upper and lower value range limits ($y_{S,min}, y_{S,max}$) for the sampling time k up to the sampling time k+L,
 (g) for each switching state sequence (SSK) and for the sampling time k up to the sampling time k+L, formation of the sum ($S_{M,v}$) of the torque infringement values ($v_{M,k}, \ldots, v_{M,k+L}$) and formation of the sum ($S_{S,v}$) of the stator flux infringement values ($v_{S,k}, \ldots, v_{S,k+L}$),
 (h) for each switching state sequence (SSK), formation of the maximum value ($v_{max}$) from the sum ($S_{M,v}$) of the torque infringement values ($v_{M,k}, \ldots, v_{M,k+L}$) and the sum ($S_{S,v}$) of the stator flux infringement values ($v_{S,k}, \ldots, v_{S,k+L}$),
 (i) setting that determined switching state combination ($SK_k$) at the starting sampling time k as the selected switching state combination ($SK_{a,k}$) with which the maximum value ($v_{max}$) is at its smallest,
 (j) repetition of steps (a) to (i), where k=k+1.

11. The method as claimed in claim 10, wherein, for m≧3, the converter circuit for connecting m voltage levels has m−2 subconnections (NP) at the DC voltage circuit and, with respect to
 step (d), for each of the switching state sequences (SSK), in addition m−2 potential trajectories ($U_{NP}$) for potentials at the m−2 subconnections (NP) are calculated from determined state value sets ($X_{e,k}, \ldots, X_{e,k+L}$) of the rotating electrical machine and the converter circuit for the starting sampling time k up to the sampling time k+L, wherein, with respect to step (e), if the m−2 potential trajectories ($U_{NP}$) at the k-th sampling time exceed a predetermined upper value range limit ($y_{Np,max}$) or fall below a predetermined lower value range limit ($y_{Np,min}$), a potential infringement value ($v_{Np,k}, \ldots, v_{Np,k+L}$) based on the upper and lower value range limits ($y_{NP,min}, y_{NP,max}$) for the sampling time k up to the sampling time k+L is calculated for each potential trajectory ($U_{NP}$), wherein, with respect to step (g), for each switching state sequence (SSK) and for the sampling time k up to the sampling time k+L, in addition the sum ($S_{NP,v}$) of the potential infringement values ($v_{Np,k}, \ldots, v_{Np,k+L}$) is formed, and wherein, with respect to step (h), for each switching state sequence (SSK), the maximum value ($v_{max}$) is additionally formed from the sum ($S_{NP,v}$) of the potential infringement values ($v_{NP,k}, \ldots, v_{NP,k+L}$).

12. The method as claimed in claim 11, wherein, if the m−2 potential trajectories ($U_{NP}$) at the k-th sampling time exceed the predetermined upper value range limit ($y_{NP,max}$), the calculation of the potential infringement value ($v_{NP,k}, \ldots, v_{NP,k+L}$) based on the upper and lower value range limits ($y_{NP,min}, y_{NP,max}$) for the sampling time k up to the sampling time k+L is done in accordance with the following formula $$v_{NP,k}, \ldots, v_{NP,k+L} = \frac{U_{T,k}, \ldots, U_{T,k+L} - y_{NP,max}}{y_{NP,max} - y_{NP,min}},$$

and wherein,
if the m−2 potential trajectories ($U_{NP}$) at the k-th sampling time fall below the predetermined lower value range limit ($y_{NP,min}$), the calculation of the potential infringement value ($v_{NP,k}, \ldots, v_{NP,k+L}$) based on the upper and lower value range limits ($y_{Np,min}, y_{Np,max}$) for the sampling time k up to the sampling time k+L is done in accordance with the following formula $$v_{NP,k}, \ldots, v_{NP,k+L} = \frac{y_{NP,min} - U_{T,k}, \ldots, U_{T,k+L}}{y_{NP,max} - y_{NP,min}},$$

where $U_{T,k}, \ldots, U_{T,k+L}$ are the trajectory values of the m−2 potential trajectories ($U_{NP}$) for the sampling time k up to the sampling time k+L.

13. The method as claimed in claim 10, wherein if the torque trajectory (M) at the k-th sampling time exceeds the predetermined upper value range limit ($y_{M,max}$), the calculation of the torque infringement value ($v_{M,k}, \ldots, v_{M,k+L}$) based on the upper and lower value range limits ($y_{M,min}, y_{M,max}$) based on the upper and lower value range limits ($y_{NP,min}, y_{NP,max}$) for the sampling time k up to the sampling time k+L is done in accordance with the following formula $$v_{M,k}, \ldots, v_{M,k+L} = \frac{M_{T,k}, \ldots, M_{T,k+L} - y_{M,max}}{y_{M,max} - y_{M,min}},$$

and wherein,
if the torque trajectory (M) at the k-th sampling time falls below the predetermined lower value range limit ($y_{M,min}$), the calculation of the torque infringement value ($v_{M,k}, \ldots, v_{M,k+L}$) based on the upper and lower value range limits ($y_{M,min}, y_{M,max}$) for the sampling time k up to the sampling time k+L is done in accordance with the following formula $$v_{M,k}, \ldots, v_{M,k+L} = \frac{y_{M,min} - M_{T,k}, \ldots, M_{T,k+L}}{y_{M,max} - y_{M,min}},$$

where $M_{T,k}, \ldots, M_{T,k+L}$ are the trajectory values of the torque trajectory (M) for the sampling time k up to the sampling time k+L.

14. The method as claimed in claim 10, wherein if the magnetic stator flux trajectory ($\phi$) at the k-th sampling time exceeds the predetermined upper value range limit ($y_{S,max}$), the calculation of the stator flux infringement value ($v_{S,k}, \ldots, v_{S,k+L}$) based on the upper and lower value range limits ($y_{S,min}, y_{S,max}$) for the sampling time k up to the sampling time k+L is done in accordance with the following formula $$v_{S,k}, \ldots, v_{S,k+L} = \frac{\Phi_{T,k}, \ldots, \Phi_{T,k+L} - y_{S,max}}{y_{S,max} - y_{S,min}},$$

and wherein,
if the magnetic stator flux trajectory ($\phi$) at the k-th sampling time falls below the predetermined lower value range limit ($y_{S,min}$), the calculation of the stator flux infringement value ($v_{S,k}, \ldots, v_{S,k+L}$) based on the upper and lower value range limits ($y_{S,min}, y_{S,max}$) for the sampling time k up to the sampling time k+L is done in accordance with the following formula $$v_{S,k}, \ldots, v_{S,k+L} = \frac{y_{S,min} - \Phi_{T,k}, \ldots, \Phi_{T,k+L}}{y_{S,max} - y_{S,min}},$$

where $\phi_{T,k}, \ldots, \phi_{T,k+L}$ are the trajectory values of the magnetic stator flux trajectory ($\phi$) for the sampling time k up to the sampling time k+L.

* * * * *